United States Patent [19]

Takamatsu et al.

[11] 4,181,635
[45] Jan. 1, 1980

[54] PRESSURE SENSITIVE ADHESIVE COMPOSITIONS

[75] Inventors: Hideo Takamatsu; Shobu Minatono; Katsuyoshi Terao; Junnosuke Yamauchi, all of Ibaragi, Japan

[73] Assignee: Kuraray Co., Ltd., Kurashiki, Japan

[21] Appl. No.: 878,889

[22] Filed: Feb. 17, 1978

[30] Foreign Application Priority Data

Feb. 21, 1977 [JP] Japan .................................. 52-18441

[51] Int. Cl.$^2$ ......................... C08L 7/00; C08L 9/02; C08L 9/06; C09J 3/12
[52] U.S. Cl. .................... 260/5; 260/27 BB; 260/27 EV; 525/92; 525/93; 525/95; 525/98; 525/99; 525/185; 525/214; 525/219; 525/222
[58] Field of Search .................. 260/5, 894, 845, 829, 260/27 BB, 27 EV, 846, 876 B

[56] References Cited

U.S. PATENT DOCUMENTS

| 3,326,824 | 6/1967 | Graham | 260/5 |
|---|---|---|---|
| 3,516,977 | 6/1970 | Reinbold | 260/5 |
| 4,048,124 | 9/1977 | Ishikawa et al. | 260/894 |
| 4,060,503 | 11/1977 | Feeney et al. | 260/894 |
| 4,096,103 | 6/1978 | Lakshmanan et al. | 260/894 |

FOREIGN PATENT DOCUMENTS

| 700959 | 12/1964 | Canada | 260/894 |
|---|---|---|---|
| 1953101 | 5/1973 | Fed. Rep. of Germany | 260/894 |
| 990439 | 4/1965 | United Kingdom | 260/894 |
| 1031015 | 5/1966 | United Kingdom | 260/5 |
| 1111978 | 5/1968 | United Kingdom | 260/894 |

Primary Examiner—Allan Lieberman
Attorney, Agent, or Firm—Oblon, Fisher, Spivak, McClelland & Maier

[57] ABSTRACT

A pressure-sensitive adhesive composition having excellent tackiness and improved thermal resistance comprises (A) a low molecular weight polyisoprene, which may be obtained by polymerizing isoprene monomer with the aid of a lithium-type catalyst, said polyisoprene having a cis-1,4 content of not less than 75%, a viscosity average molecular weight of 8,000 to 77,000 and an Mw/Mn value (Mw: weight average molecular weight; Mn: number average molecular weight) of 1.0 to 2.7 and (B) an elastomer.

11 Claims, No Drawings

PRESSURE SENSITIVE ADHESIVE COMPOSITIONS

BACKGROUND OF THE INVENTION

1. Field of the Invention

This invention relates to a pressure-sensitive adhesive composition with excellent tackiness and excellent thermal resistance, which composition comprises a low molecular weight polyisoprene which has a viscosity average molecular weight in the range of 8,000 to 77,000 and a defined narrow molecular weight distribution and which is liquid at room temperature, and an elastomer formulated with said low molecular weight polyisoprene.

2. Description of the Prior Art

In various pressure-sensitive tapes and labels generally, high initial tack strength and tackiness at low temperatures are known to be essential qualities. Typical examples of such products are plasters which are expected to have high initial tack strength, pressure-sensitive adhesive tapes for packaging use in cold climates, pressure-sensitive adhesive tapes for frozen food, and pressure-sensitive labels. Generally in such applications where high tackiness is required, it is conventional to employ a softener as a component of the adhesive composition. Among the softeners frequently employed are mineral oils, lanolin, tackifiers with low softening points (room temperature and less), liquid low molecular weight polymers such as polyolefins and the like.

While the use of such softeners generally helps yield adhesive compositions with high tackiness, the compositions, however, are seriously lacking in resistance to heat. For example, when such a pressure-sensitive adhesive tape containing a softener is used or stored in a comparatively high temperature environment, the flow of the adhesive composition becomes so great that it penetrates into the backing member, thus detracting from the performance of the tape or when the pressure-sensitive adhesive tape is peeled off from where it has been, a large amount of the adhesive composition is left behind on the location to stain the latter. Those are some of the problems that must be overcome.

It is also known to employ, as said softener, a low molecular weight polyisoprene obtained by the thermal depolymerization of a high molecular weight polyisoprene or a low molecular weight polyisoprene obtained by a polymerization reaction using a Ziegler type catalyst or a radical catalyst (e.g. U.S. Pat. No. 3,326,824, and related patents) but the resultant compositions also have many disadvantages to overcome. Thus, the low molecular polyisoprene obtained by thermal depolymerization of a high molecular weight polyisoprene (for example, the high cis-1,4-polyisoprene rubber obtained by polymerization with a Ziegler-type or lithium-based catalyst, or natural rubber) has a very broad molecular weight distribution and any adhesive composition containing it has such disadvantages as poor thermal resistance and, as a consequence of the impurities produced as by-products in the course of thermal depolymerization, some intense odor and severe discoloration. These disadvantages impose limitations on the utility of such compositions; for example, the material cannot be used in pressure-sensitive adhesive tapes for food and medical applications. The low molecular weight polyisoprene obtained by polymerization using a Ziegler catalyst is known, for example from Japanese Patent Publication No. 3831/1977, but such low molecular weight polyisoprene has a rather broad molecular weight distribution and poor thermal resistance in addition to the problem that, as it polymerizes, it yields a polymeric gel which detracts from tackiness, among other things. The low molecular weight polyisoprene obtained by means of a radical catalyst has only a very limited cis-1,4 content and, hence, poor flexibility which makes the material unsuitable for use as a softener.

SUMMARY OF THE INVENTION

It is a principal object of this invention to provide an adhesive composition possessed of excellent tackiness, particularly a composition which displays high tackiness in cold climates and is also highly resistant to heat.

Another object of the invention is to provide an adhesive composition which, in pressure-sensitive applications such as adhesive tapes, etc., is substantially free from the bleeding or migration of its adhesive components and the problem of soiling locations to which it may be applied.

It is still another object of this invention to provide an adhesive composition which, because of its lack of color and odor due to contaminant impurities, can be used in a broad spectrum of applications and, in addition, which has superior workability.

Briefly, these objects and other objects of the invention as hereinafter will become more readily apparent can be attained by providing an adhesive composition which comprises (A) a low molecular weight polyisoprene, which may be produced by the polymerization of isoprene monomer with a lithium-based catalyst, and which has a cis-1,4 content of not less than 75%, a viscosity average molecular weight in the range of 8,000 to 77,000 and a $\overline{M}w/\overline{M}n$ value ($\overline{M}w$: weight average molecular weight; $\overline{M}n$: number average molecular weight) in the range of 1.0 to 2.7 and (B) an elastomer.

DETAILED DESCRIPTION OF THE INVENTION

The viscosity average molecular weight, molecular weight distribution and micro-structure of the low molecular weight polyisoprene employed in the adhesive composition of this invention will hereinafter be explained.

To ensure a sufficiently high tackiness, the viscosity average molecular weight $\overline{M}v$ of the polyisoprene must lie somewhere in the range of 8,000 to 77,000 and preferably from 15,000 to 65,000.

Molecular weights less than the lower limit of the above range fail to produce the desired high resistance to heat, while molecular weights in excess of the upper limit fail to give flexibility of the order required of a softener. The viscosity average molecular weight is a function of the intrinsic viscosity $[\eta]$ of the molecular weight polyisoprene in toluene at 30° C. and is calculated by means of the following equation [For details, The Japanese Society of Chemistry (ed.), Lectures on Experimental Chemistry 8, High Polymer Chemistry, 1964, Maruzen]

$$[\eta] = 1.21 \times 10^{-4} \overline{M}v^{0.77}$$

The $\overline{M}w/\overline{M}N$ value which is used as a measure of the breadth of molecular weight distribution is desirably in the range of 1.0 to 2.7 and, for more satisfactory results, in the range of 1.0 to 2.1. When this value is over 2.7, the polyisoprene fails to help produce an adequate thermal resistance. The $\overline{M}w/\overline{M}N$ value is a parameter which is determinable by gel permeation chromatography and the lower the $\overline{M}_W/\overline{M}_N$ value, the narrower is the molecular weight distribution of the polyisoprene.

The cis-1,4 structure content which defines the microstructure of polyisoprene must not be less than 75%. Below this threshold of 75%, the product is deficient in flexibility of the order required in a softening component.

A low molecular weight polyisoprene suitable for the purposes of this invention can be produced by the process of polymerizing isoprene monomer with the aid of lithium metal or an organo-lithium catalyst, which process per se is disclosed in U.S. Pat. No. 3,119,800, G.B. Pat. No. 990, 439, and related patents. A polymerization solvent facilitates control of the polymerization reaction and is preferable employed, although the reaction may be done without solvent in special cases. To confine the molecular weight distribution within the defined range according to this invention, the polymerization solvent is preferably an inert hydrocarbon as exemplified by n-butane, isopentane, n-hexane, n-heptane, benzene, toluene, xylene, and the like.

Preferred examples of the organo-lithium catalyst include methyllithium, propyllithium, butyllithium, α-naphthyllithium, methyldilithium, distyrenyllithium, and the like. To obtain a polyisoprene having a defined molecular weight and molecular weight distribution in accordance with this invention, the catalyst is preferably used in a proportion of 0.88 to 23 milliequivalents as lithium and for better results, 1.05 to 12.2 milliequivalents as lithium per mol equivalent of isoprene monomer.

The elastomer employed according to this invention may be any elastomer that is solid at room temperature. Suitable such elastomers include polybutadiene, cis-1,4-polyisoprene, natural rubber, styrene-butadiene (random or block) copolymer, styrene-isoprene (random or block) copolymer, acrylonitrile-butadiene copolymer, acrylonitrile-isoprene copolymer, ethylene-propylene copolymer, ethylene-vinyl acetate copolymer, chloroprene rubber, polyisobutyrene, butyl rubber, and the like. These elastomers may be employed either alone or as a mixture of two or more different elastomers. Because, in chemical structure, elastomers containing isoprene as a repeating unit are more or less similar to the low molecular weight polyisoprene according to this invention, they are most desirable from the point of view of compatibility.

For the purposes of this invention and particularly from the standpoints of tackiness and thermal resistance, the ratio (A/B) of said low molecular weight polyisoprene (A) to said elastomer (B) should lie somewhere between 5/95 and 85/15 and, preferably between 10/90 and 60/40. When the proportion of the low molecular weight polyisoprene is below the above-mentioned lower limit, the tackiness of the composition will be inadequate and, conversely, when said proportion is beyond the upper limit, flow of the adhesive composition and other problems result.

In the practice of this invention, it is also possible to employ such additional components as rosin-type resins, terpene-type resins, aromatic hydrocarbon resins, aliphatic hydrocarbon resins, alicyclic hydrocarbon resins, phenolic resins, coumarone-indene resins, hydrogenated petroleum oil resins, and the like. Because the low molecular weight polyisoprene in this invention shares the properties of tackifying resins, the amounts of such additional components should be comparatively small, e.g. desirably not more than 250 weight parts based on 100 weight parts of the elastomer component.

If necessary, the adhesive composition according to this invention may further contain filters such as calcium carbonate, zinc oxide, titanium oxide, and the like, antioxidants, and plastics such as polystyrene, polypropylene, polyethylene, and the like. However, in no case should the weight of polyisoprene (A) plus elastomer (B) be less than 5% of the total weight of the adhesive composition, and preferably the combination of (A) and (B) should comprise at least 15% of the total adhesive composition.

Because the present adhesive composition with excellent tackiness and thermal resistance characteristics employs a specified low molecular weight cis-1,4-polyisoprene which is substantially free from impurities, odor and color as the softener component, it can be used in pressure-sensitive applications, for example as cellophane tape, kraft tape, masking paper, plasters and other pressure-sensitive tapes, pressure-sensitive labels and so forth.

Having generally described the invention, a more complete understanding can be obtained by reference to certain specific examples, which are included for purposes of illustration only and are not intended to be limiting unless otherwise specified.

EXAMPLE 1

An autoclave was charged with isoprene monomer, n-butyllithium as the catalyst, and n-heptane as the solvent, the amount of which was sufficient to give a monomer concentration of 40% and the polymerization was carried out in the presence of an inert gas at 60° C. for 5 hours. The resultant polymer slurry was washed with water and dried under reduced pressure, whereby a low molecular weight polyisoprene was obtained as a viscous fluid (Sample a). As determined by infrared spectrometry, the cis-1,4 content of this low molecular weight polyisoprene was 84%, with a viscosity average molecular weight of 43,100. The $\overline{M}_w/\overline{M}_n$ value of this polyisoprene as determined by gel permeation chromatography (Waters, U.S., model 200A) was 1.8.

As control, the above polymerization procedure was repeated except that isoprene monomer was fed in a sufficient amount to give a concentration of 15% and, as the catalyst, a reduced amount of n-butyllithium was added. The resultant polymer slurry was washed with water and treated with a coagulator to prepare solid crumbs. The crumbs were dried in a curent of heated air and thermally depolymerized in a high-temperature electric oven at about 300° C. for 4 hours. By the above procedure was obtained a low molecular weight polyisoprene (Sample b) having a viscosity average molecular weight of 45,200 which approximated the corresponding molecular weight of the above Sample a. This low molecular weight polyisoprene (Sample b) had a cis-1,4 content of 87% and an $\overline{M}_w/\overline{M}_n$ value of 3.9.

Using Samples a and b, solutions in toluene of the adhesive compositions of Table 1 were prepared and each solution was coated by an applicator on a sheet of uncoated paper and dried to prepare a pressure-sensitive tape.

Table 1

| Composition | Recipe 1 | Recipe 2 |
|---|---|---|
| Masticated natural rubber | 40 wt. parts | 40 wt. parts |
| Low molecular weight polyisoprene (sample a) | 60 wt. parts | — | performances of the tapes were evaluated (See Table 4).

Table 3

|  | Recipe 3 | Recipe 4 | Recipe 5 | Recipe 6 |
| --- | --- | --- | --- | --- |
| Masticated natural rubber | 100 wt. pts. | 100 wt. pts. | 100 wt. pts. | 100 wt. pts. |
| Low mol. wt. polyisoprene (Sample c) | 50 wt. pts. | — | — | — |
| Low mol. wt. polybutene[1] | — | 50 wt. pts. | — | — |
| Naphthene oil[2] | — | — | 50 wt. pts. | — |
| Tackifying resin[3] | 60 wt. pts. | 60 wt. pts. | 60 wt. pts. | 60 wt. pts. |
| antioxidants[4] | 0.5 wt. pts | 0.5 wt. pts. | 0.5 wt. pts. | 0.5 wt. pts. |

[1]Nisseki Polybutene HV-300 ®, manufactured by Nippon Petrochemicals, Ltd.
[2]Sunthene 4340 ®, manufactured by Sun Oil Company
[3]Polyterpene resin: YSPX 1000 ® manufactured by Yasuhara Yusi Kogyo Co., Ltd.
[4]2,2'-Methylenebis (4-methyl-6-tert-butylphenol); Nocrac NS-6 ® manufactured by Ouchi Sinko Chemical Industries Ltd.

Table 1-continued

| Composition | Recipe 1 | Recipe 2 |
| --- | --- | --- |
| Low molecular weight polyisoprene (sample b) | — | 60 wt. parts |
| Tackifying resin[1] | 80 wt. parts | 80 wt. parts |
| antioxidants[2] | 0.5 wt. parts | 0.5 wt. parts |

[1]Polyterpene resin: YSPX 1000 ®, manufactured by Yasuhara Yusi Kogyo Co., Ltd.
[2]2,2'-Methylenebis(4-methyl-6-tert-butylphenol); Nocrac NS-6 ®, manufactured by Ouchi Sinko Chemical Industries Ltd.

The performances and thermal resistances of these pressure-sensitive tapes are given in Table 2.

It will be seen from Table 4 that whereas the low-temperature tackiness values of Recipes 3, 4 and 5, all of which contain a softening component, are considerably superior to the tackiness of Recipe 6 which contains no such component, the thermal resistances of the samples incorporating the low molecular weight polybutene or naphthene oil are extremely low. Moreover, in cohesive force, the product containing the low molecular weight polyisoprene (Sample c) is considerably superior to the products containing the low molecular weight polybu- Table 2

| Recipe | Low mol wt. polyisoprene | | Tackiness; at room temperature[1] Ball No. | Cohesive force, at room temperature[2] (min.) | Thermal resistance[3] (Bleeding) |
| --- | --- | --- | --- | --- | --- |
| | Viscosity average mol. wt. | Mol. wt. distribution ($M_W/M_N$) | | | |
| 1 a | 43,100 | 1.8 | 32 | 11 | Absent |
| 2 b | 45,200 | 3.9 | 32 | 10 | Present |

[1]Ball tack:
Determined by the rolling ball method. 10 cm-long strip of the pressure-sensitive adhesive tape is firmly held with its adhesive layer up on a flat, smooth surface inclined at an angle of 30° with respect to the horizontal. Steel balls with diameters from 1/32" to 1" at increments of 1/32" (Ball No. 1 to Ball No. 32, respectively) are allowed to roll down the surface from a position 10 cm away from the upper end of the tape and the No. of the ball which has just stopped short on the tape without further rolling is used to represent the tackiness of the pressure-sensitive adhesive tape.
[2]Cohesive force:
The pressure-sensitive adhesive tape is put on a stainless steel plate in area of 15 × 12 m/m and its creep value is determined under a load of 1 kg. The time which has elapsed before the load falls is used to represent the cohesive force of the tape.
[3]Thermal resistance:
The pressure-sensitive adhesive tape is allowed to stand in a geer oven at 70° C. for 20 hours and the presence or absence of penetration (bleeding) of the adhesive composition into the substance of the backing paper is examined.

EXAMPLE 2

An autoclave was charged with a solution of n-butyllithium in cyclohexane and while the temperature was maintained at 45° C., isoprene monomer was added in a stepwise fashion to prepare a low molecular polyisoprene by a polymerization reaction. A low molecular weight polyisoprene sample (Sample c) was prepared from the resultant polymer slurry in the same manner as Example 1. This low molecular weight polyisoprene had a viscosity average molecular weight of 15,200 and a cis-1,4 content of 81%. The $\overline{M}_W/\overline{M}_N$ value, as a measure of molecular weight distribution, of this sample was 2.2. By a procedure similar to that described in Example 1, adhesive compositions were prepared according to the recipes of Table 3 using Sample c as well as the commercial low molecular weight polybutene and naphthene oil. These compositions were then used to fabricate pressure-sensitive adhesive tapes and the tene or naphthene oil.

Table 4

| Recipe | Softening component | Low temp. tackiness[1] Ball No. | Cohesive force, room temp. (min.) | Heat resistance[2] | |
| --- | --- | --- | --- | --- | --- |
| | | | | Bleeding | Tackiness after standing |
| No. 3 | Low mol. wt. polyisoprene (Sample c) | 7 | Not less than 120 | Absent | Present |
| No. 4 | Low mol. wt. polybutene | 6 | 21 | Present | Absent |
| No. 5 | Naphthene oil | 8 | 3 | Present | Absent |
| No. 6 | | 0 | Not less than 120 | Absent | Present |

[1]Determined by the rolling ball method as in Example 1 in the atmosphere at 5° C.
[2]Examined after standing at 70° C. for 7 days

EXAMPLE 3

The polymerization procedure of Example 1 was repeated except that n-hexane was used as the polymerization solvent with the amount of n-butyllithium as the catalyst being varied to prepare polyisoprenes ((Sample d, e and f), the viscosity average molecular weights of which were 6,000, 37,300 and 122,000, respectively. These polyisoprenes had $\overline{M}_w/\overline{M}_n$ values approximating 2.2.

These three different polymers were used to prepare the adhesive compositions of Table 5. Kraft paper is employed as a backing sheet of pressure-sensitive tape.

Table 5

|  | Recipe 7 | Recipe 8 | Recipe 9 |
| --- | --- | --- | --- |
| Masticated high cis-1,4-polyisoprene rubber Softening component: | 100 wt. pts. | 100 wt. pts. | 100 wt. pts. |
| Polyisoprene (d) | 100 wt. pts. | — | — |
| Polyisoprene (c) | — | 100 wt. pts. | — |
| Tackifying resin α(2) | 50 wt. pts. | 50 wt. pts. | 50 wt. pts. |
| Tackifying resin β(3) | 10 wt. pts. | 10 wt. pts. | 10 wt. pts. |
| antioxidants(4) | 1 wt. pts. | 1 wt. pts. | 1 wt. pts. |

(1)A polyisoprene rubber with 98% cis-1,4-structure as obtained by polymerization with a Ziegler type catalyst.
(2)alicyclic resin, Arkon® P124, manufactured by Arakawa Forest Chemical Industries, Ltd.
(3)Aromatic hydrocarbon resin, Petrosin® 120, manufactured by Mitsui Petrochemical Industries, Ltd.
(4)2,6-Di-tert-butyl-4-methylphenol, Nocrac® 200, manufactured by Ouchi Shinko Chemical Industries Ltd.

The performances of these adhesive compositions are set forth in Table 6. It will be seen that inadequate thermal resistance is shown when the molecular weight of the polyisoprene used as the softener component is too low, while an excessively high molecular weight polyisoprene imparts an inadequate softening effect, failing to give a satisfactory degree of tackiness.

In a further experiment in which the pressure-sensitive adhesive tapes made from these compositions were each applied to a stainless steel plate and, after an hour of standing at 80° C., peeled off, the composition of Recipe 7 was found to remain in larger amounts on the stainless steel plate, thus soiling the plate, as compared with the compositions of Recipes 8 and 9.

Table 6

| Recipe | Viscosity average mol. wt. of polyisoprene | Low-temperature tackiness Ball No. | Thermal Resistance Bleeding | Tackiness after standing |
| --- | --- | --- | --- | --- |
| No. 7 | 6,000 | 6 | Present | Absent |
| No. 8 | 37,300 | 5 | Absent | Present |
| No. 9 | 122,000 | 1 | Absent | Present |

EXAMPLE 4

Low molecular weight polyisoprenes having the viscosity average molecular weights of 5,100, 33,500 and 80,600 (Samples g, h, and i) were prepared by a procedure similar to that described in Example 2. Whereas the $\overline{M}_w/\overline{M}_N$ value of sample h was 1.7, g and i had $\overline{M}_w/\overline{M}_N$ values less than 2.7. Samples g, h and i were admixed in the proportions of 30%, 40% and 30%, respectively, by weight to prepare a mixed low molecular weight polyisoprene (Sample j), the viscosity average molecular weight and $\overline{M}_w/\overline{M}_N$ value of which were 37,600 and 5.3, respectively. On the other hand, the high molecular weight polyisoprene prepared as a control sample in Example 1 was kneaded in a closed type mixer at 200° to 250° C. for an extended time. This disruption of molecular chains resulted in a low molecular weight polyisoprene (Sample K), the viscosity average molecular weight and $\overline{M}_w/\overline{M}_N$ value of which were 34,200 and 7.3, respectively. Using the above 3 samples, the adhesive compositions indicated in Table 7 were prepared.

Table 7

|  | Recipe −10 | Recipe −11 | Recipe −12 |
| --- | --- | --- | --- |
| Masticated high cis-1,4-polyisoprene rubber Softening component: | 60 wt. pts. | 60 wt. pts. | 60 wt. pts. |
| Low mol. wt. polyisoprene (h) | 40 wt. pts. | — | — |
| Low mol. wt. polyisoprene (j) | — | 40 wt. pts. | — |
| Low mol. wt. polyisoprene (k) | — | — | 40 wt. pts. |
| Tackifying resin γ(1) | 20 wt. pts. | 20 wt. pts. | 20 wt. pts. |
| δ(2) | 70 wt. pts. | 70 wt. pts. | 70 wt. pts. |

(1)Rosin type resin; Ester Gum ®, manufactured by Arakawa Forest Chemical Industries, Ltd.
(2)Rosin type resin; YSPX 1150 ®, manufactured by Yasuhara Yusikogyo Co., Ltd Pressure-sensitive tapes were fabricated using the adhesive compositions of Table 7 and the relative performances of the tapes were evaluated (Table 8). It will be apparent from Table 8 that while all of Samples, h, j, and k provide for adequate tackiness, the compositions incorporating j and k, both of which are broader in molecular weight distribution than h, are comparatively poor in thermal resistance.

Table 8

| Recipe | Tackiness at room temperature Ball No. | Thermal resistance Bleeding after standing at 70° C. for 14 days |
| --- | --- | --- |
| No. 10 | 32 | Absent |
| No. 11 | 31 | Present |
| No. 12 | 32 | Present |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a pressure-sensitive adhesive composition comprising a low molecular weight polyisoprene (A), an elastomer (B) selected from the group consisting of polybutadiene, cis-1,4-polyisoprene, natural rubber, styrene-butadiene random or block copolymer, styrene-isoprene random or block copolymer, acrlyonitrile-butadiene copolymer, acrylonitrile-isoprene copolymer, ethylene-propylene copolymer, ethylene-vinyl acetate copolymer, chloroprene rubber, polyisobutylene and butyl rubber, and a tackifying resin (C), wherein the improvement comprises:

using as said low molecular polyisoprene (A) a polyisoprene having a cis-1,4 content of at least 75%, a viscosity average molecular weight of between 8,000 and 77,000 and a $\overline{M}_w/\overline{M}_n$ value of from 1.0 to 2.7, wherein $\overline{M}w$ is the weight average molecular weight and $\overline{M}n$ is the number average molecular weight; and wherein the weight ratio of said polyisoprene (A) to said elastomer (B) is 5-85:95-15, and wherein said tackifying resin (C) comprises up to 250 weight parts for each 100 weight of said elastomer.

2. The pressure-sensitive adhesive composition of claim 1, wherein said elastomer is a polymer containing repeating isoprene units.

3. The adhesive composition of claim 1 wherein said elastomer is natural rubber.

4. The pressure-sensitive adhesive composition of claim 1 wherein said elastomer is a synthetic cis-1,4-polyisoprene.

5. The pressure-sensitive adhesive composition of claim 1 which said tackifying resin is at least one member selected from the group consisting of rosin-type resin, terpene-type resin, aromatic hydrocarbon resin, aliphatic hydrocarbon resin, alicyclic hydrocarbon resin, phenolic resin, coumarone-indene resin and hydrogenated petroleum oil resin.

6. The pressure-sensitive adhesive composition of claim 1, wherein said low molecular weight polyisoprene is obtained by polymerizing isoprene monomer using a lithium catalyst.

7. The pressure-sensitive adhesive composition of claim 1 wherein said low molecular weight polyisoprene is obtained by polymerizing isoprene monomer in a hydrocarbon solvent selected from the group consisting of n-butane, isopentane, n-hexane, n-heptane, benzene, toluene and xylene, using a lithium catalyst selected from the group consisting of methyllithium, propyllithium, butyllithium, α-naphthyllithium, methylenedilithium and distyrenyllithium.

8. The pressure-sensitive adhesive composition of claim 7, wherein said lithium-type catalyst is used in the proportion of 0.88–23 miliequivalents catalyst as lithium per mol equivalent of isoprene monomer.

9. The pressure-sensitive adhesive composition of claim 8, wherein said proportion is 10.5–12.2 milliequivalents catalyst as lithium per mol equivalent of isoprene monomer.

10. The pressure-sensitive adhesive composition of claim 1, wherein the viscosity average molecular weight of said low molecular weight polyisoprene (A) is between 15,000 and 65,000.

11. The pressure-sensitive adhesive composition of claim 1, wherein said vaue of $\overline{M}_w/\overline{M}_n$ is in the range of from 1.0 to 2.1.

* * * * *